US010507815B2

(12) United States Patent
Yamamoto

(10) Patent No.: US 10,507,815 B2
(45) Date of Patent: Dec. 17, 2019

(54) BRAKE SYSTEM

(71) Applicant: TOYOTA JIDOSHA KABUSHIKI KAISHA, Toyota-shi, Aichi-ken (JP)

(72) Inventor: Naoki Yamamoto, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 36 days.

(21) Appl. No.: 15/990,869

(22) Filed: May 29, 2018

(65) Prior Publication Data

US 2018/0354484 A1 Dec. 13, 2018

(30) Foreign Application Priority Data

Jun. 7, 2017 (JP) .................................. 2017-112298

(51) Int. Cl.
| | | |
|---|---|---|
| *B60T 13/66* | (2006.01) | |
| *B60T 8/36* | (2006.01) | |
| *B60T 13/68* | (2006.01) | |
| *B60T 15/02* | (2006.01) | |
| *B60T 13/16* | (2006.01) | |
| *B60T 7/04* | (2006.01) | |

(52) U.S. Cl.
CPC ............ *B60T 13/662* (2013.01); *B60T 8/363* (2013.01); *B60T 13/686* (2013.01); *B60T 15/028* (2013.01); *B60T 7/042* (2013.01); *B60T 13/16* (2013.01)

(58) Field of Classification Search
CPC ........ B60T 13/662; B60T 8/63; B60T 13/686; B60T 15/028; B60T 7/042; B60T 13/16
See application file for complete search history.

(56) References Cited

U.S. PATENT DOCUMENTS 6,351,702 B1 *  2/2002  Tange ................ B60K 31/0008
                                                    180/170
2009/0236903 A1 *  9/2009  Nishino .................. B60T 8/442
                                                    303/3

FOREIGN PATENT DOCUMENTS

JP            2011-51494 A      3/2011

* cited by examiner

*Primary Examiner* — Melanie Torres Williams
(74) *Attorney, Agent, or Firm* — Sughrue Mion, PLLC

(57) ABSTRACT

A brake system includes: brake cylinders; electromagnetic valve devices respectively corresponding to the brake cylinders and capable of individually controlling hydraulic pressures in the respective brake cylinders; pumps respectively connected to the brake cylinders; one pump motor driven in common with the pumps; and a brake-hydraulic-pressure controller that controls the electromagnetic valve devices and the one pump motor to control the hydraulic pressures in the respective brake cylinders. The brake-hydraulic-pressure controller includes: a first pressure-increase controller that controls the one pump motor to bring the hydraulic pressures in the respective brake cylinders closer to respective target hydraulic pressures; and a second pressure-increase controller that controls the one pump motor based on a greatest one of the target hydraulic pressures for the respective brake cylinders and control the electromagnetic valve devices to bring the hydraulic pressures in the respective brake cylinders closer to the respective target hydraulic pressures.

12 Claims, 7 Drawing Sheets

BRAKE SYSTEM

CROSS REFERENCE TO RELATED APPLICATION

The present application claims priority from Japanese Patent Application No. 2017-112298, which was filed on Jun. 7, 2017, the disclosure of which is herein incorporated by reference in its entirety.

BACKGROUND

The following disclosure relates to a brake system installed in a vehicle.

Patent Document 1 (Japanese Patent Application Publication No. 2011-51494) discloses a brake system including: a plurality of brake cylinders; a plurality of pumps connected to the respective brake cylinders; and a plurality of electromagnetic valve devices provided corresponding to the respective brake cylinders and each including at least one electromagnetic valve.

SUMMARY

An aspect of the disclosure relates to a brake system that is configured such that pumps are respectively connected to a plurality of brake cylinders provided respectively with electromagnetic valve devices, and that is configured to well control the electromagnetic valve devices and a pump motor configured to drive the pumps. For example, the brake system is configured to control the pump motor and the electromagnetic valve devices to achieve good power efficiency and good controllability.

In one aspect of the disclosure, a brake system includes: a first pressure-increase controller configured to control a pump motor to control hydraulic pressures in respective brake cylinders; and a second pressure-increase controller configured to control the electromagnetic valve devices to control the hydraulic pressures in the respective brake cylinders in a state in which working liquid is supplied from each of the pumps to a corresponding one of the brake cylinders by an amount greater than or equal to a necessary and sufficient amount.

Good power efficiency indicates relatively high power efficiency with a small amount of needless power consumption. Good controllability indicates controllability including at least one of (i) good response and good followability and (ii) controllability with high accuracy.

Good power efficiency is achieved in control executed by the first pressure-increase controller. Good controllability is achieved in control executed by the second pressure-increase controller. It is difficult to achieve good controllability for a brake system including the first pressure-increase controller but not including the second pressure-increase controller. It is difficult to achieve good power efficiency for a brake system including the second pressure-increase controller but not including the first pressure-increase controller. In contrast, the present brake system includes both of the first pressure-increase controller and the second pressure-increase controller. Thus, it is possible to achieve good power efficiency and good controllability.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

Figure 1:
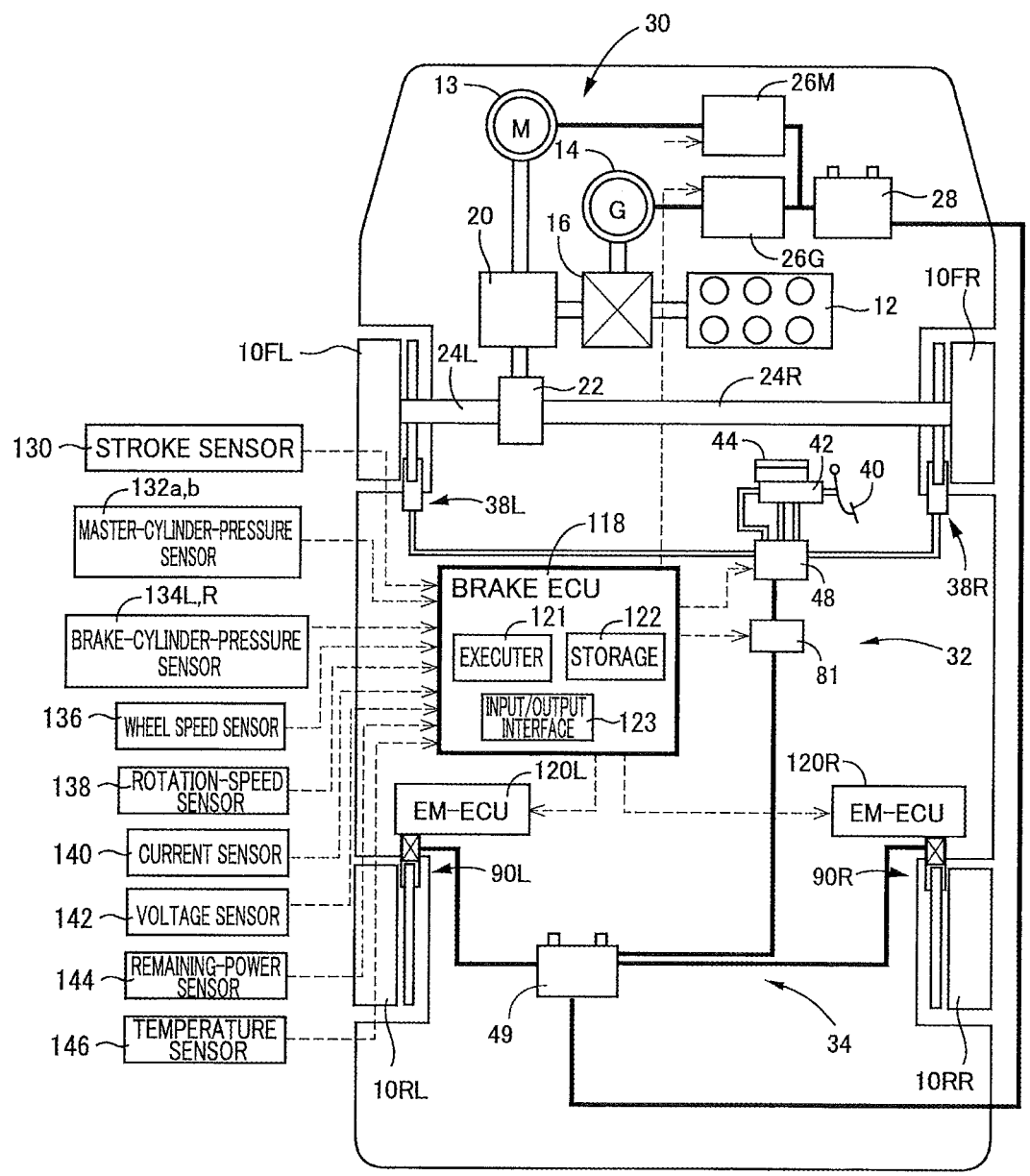
FIG. 1 is a conceptual view of a vehicle including a brake system according to a first embodiment.

FIG. 1 schematically illustrates one example of a vehicle installed with a brake system according to the present embodiment. The vehicle is a hybrid vehicle including front left and right wheels 10FL, 10FR and rear left and right wheels 10RL, 10RR. The front left and right wheels 10FL, 10FR are drive wheels. A drive system of the present vehicle includes: an engine 12 and an electric motor 13 each as a drive source; a generator 14 principally serving as a power generator; and a power split device 16.

The power split device 16 is configured to split rotation of the engine 12 into rotation of the generator 14 and rotation of an output shaft. The electric motor 13 is connected to the output shaft via a reduction mechanism 20 that serves as a speed reducer. The rotation of the output shaft is transmitted to the front left and right wheels 10FL, 10FR via differential gears 22 and drive shafts 24L, 24R to rotate the front left and right wheels 10FL, 10FR. The generator 14 and the electric motor 13 are connected to a battery 28 (e.g., a main battery) via inverters 26G, 26M, respectively. The battery 28 stores electric energy obtained by the generator 14 and the electric motor 13. Operations of the generator 14 and the electric motor 13 are respectively controlled by controls for the inverters 26M, 26G.

The brake system according to the present embodiment includes: a regenerative braking device 30 and a hydraulic braking device 32 each configured to apply a brake force to the front left and right wheels 10FL, 10FR; and an electric braking device 34 configured to apply a brake force to the rear left and right wheels 10RL, 10RR.

The regenerative braking device 30 includes the electric motor 13, the inverter 26M, and the battery 28. Regenerative braking of the electric motor 13 applies a regenerative brake force as the brake force to the front left and right wheels 10FL, 10FR. Electric power generated by the electric motor 13 is supplied to the battery 28 via the inverter 26M and stored in the battery 28. The regenerative brake force to be applied to the front left and right wheels 10FL, 10FR is controlled by control for the inverter 26M.

The hydraulic braking device 32 is configured to apply a hydraulic brake force (as one example of a friction brake force) as the brake force to the front left and right wheels 10FL, 10FR. The hydraulic braking device 32 includes: hydraulic brakes 38L, 38R provided for the respective front left and right wheels 10FL, 10FR; a master cylinder 42 coupled to a brake pedal 40 which is a brake operating member operable by a driver; a hydraulic-pressure control unit 48 provided between each of the master cylinder 42 and a reservoir 44 and each of brake cylinders 46L, 46R (see FIG. 2) of the respective hydraulic brakes 38L, 38R; and a battery 49 (e.g., an auxiliary battery for the main battery 28) configured to supply electric power to the hydraulic-pressure control unit 48.

Figure 2:
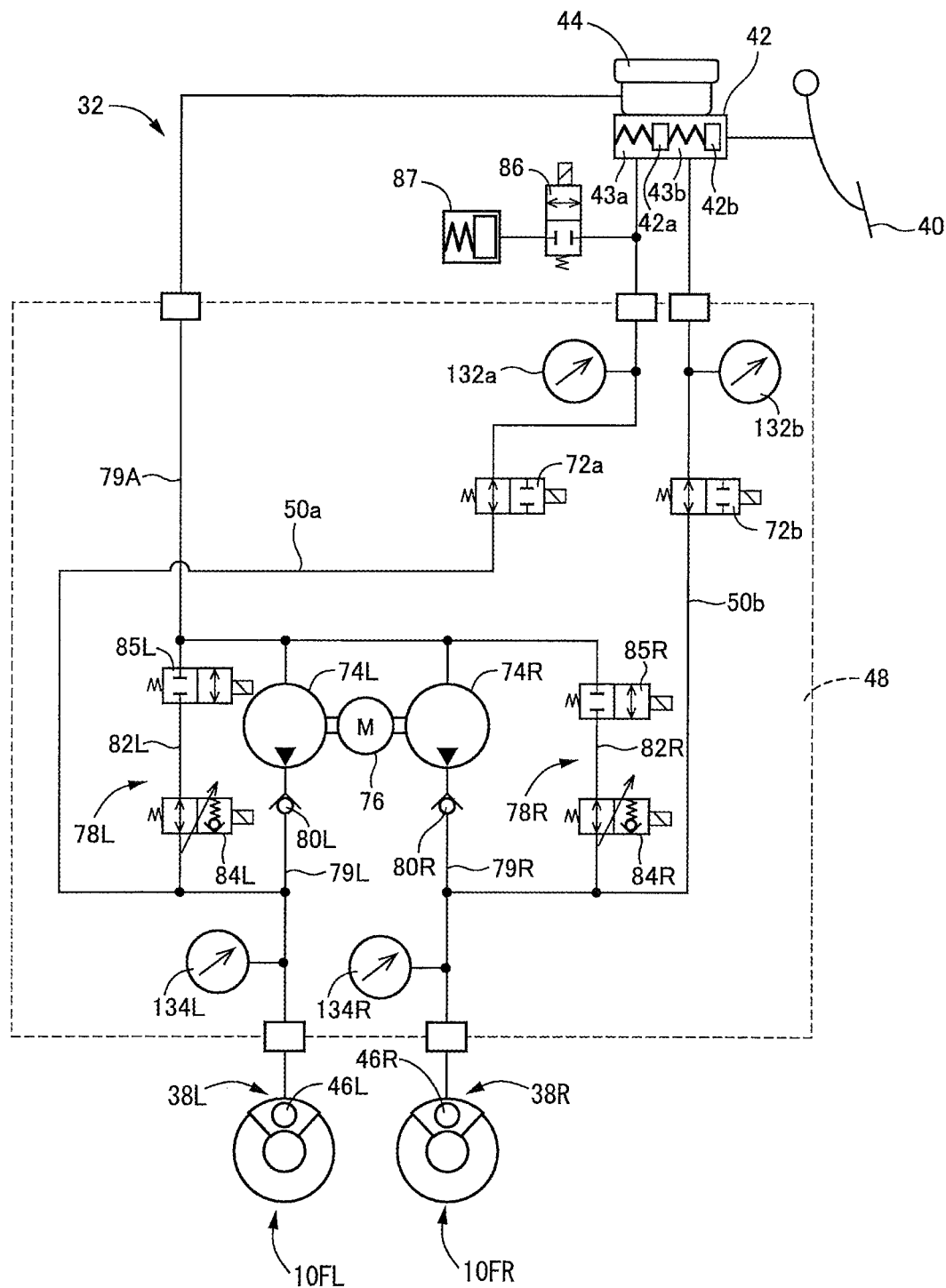
FIG. 2 is a diagram of a hydraulic circuit of a hydraulic braking device included in the brake system.

As illustrated in FIG. 2, the master cylinder 42 is a tandem cylinder including: two pressurizing pistons 42a, 42b fluid-tightly and slidably fitted in a housing; and two pressure chambers 43a, 43b defined in front of the respective two pressurizing pistons 42a, 42b. The brake pedal 40 is coupled to the pressurizing piston 42b located at a rear of the pressurizing piston 42a. A hydraulic pressure is produced in the two pressure chambers 43a, 43b with a magnitude related to a brake operation force that is an operating force applied to the brake pedal 40 by the driver.

Master passages 50a, 50b are connected to the respective pressure chambers 43a, 43b and to the respective brake cylinders 46L, 46R via the respective master passages 50a, 50b. In the following description, in the case where devices, such as the hydraulic brakes 38L, 38R, provided corresponding to the front left and right wheels 10FL, 10FR need not to be distinguished by their respective wheel positions (i.e., the front left wheel and the front right wheel) or are collectively referred, these devices will be referred without their respective suffixes (L, R). On the other hand, in the case where such distinction is required, the devices will be referred with their respective suffixes. The rear left and right wheels 10RL, 10RR will be expressed in the same manner.

Figure 3:
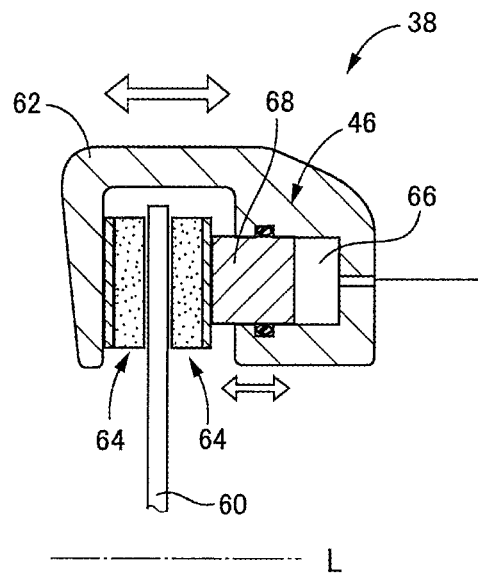
FIG. 3 is a cross-sectional view a hydraulic brake included in the hydraulic braking device.

As illustrated in FIG. 3, each of the hydraulic brakes 38 is a disc brake as a friction brake. The hydraulic brake 38 includes: a disc rotor 60 that is rotated together with a corresponding one of the front wheels 10F; a caliper 62 supported by a non-rotating member so as to be movable in a direction parallel with a rotation axis L of the front wheels 10F; a pair of brake pads 64 as friction engagement members held by the non-rotating member and located on opposite sides of the disc rotor 60; and the brake cylinder 46 provided in the caliper 62.

In the case where working liquid is supplied to a hydraulic-pressure chamber 66 of the brake cylinder 46 (hereinafter may be simply referred to as "working liquid is supplied to the brake cylinder 46"), a piston 68 is moved in the direction parallel with the rotation axis L, and the caliper 62 is moved, so that the brake pads 64 are pressed against and frictionally engaged with the disc rotor 60. That is, the hydraulic brake 38 is actuated to reduce rotation of the front wheel 10F.

The hydraulic-pressure control unit 48 includes: master cut-off valves 72a, 72b which are normally-open electromagnetic open/close valve provided in the respective master passages 50a, 50b; two pumps 74L, 74R connected to the respective brake cylinders 46L, 46R; a pump motor 76 configured to drive the pumps 74L, 74R; and electromagnetic valve devices 78L, 78R provided corresponding to the respective brake cylinders 46L, 46R.

The hydraulic-pressure control unit 48 has: a reservoir passage 79A connected to the reservoir 44; and pump passages 79L, 79R each connecting between the reservoir passage 79A and a portion of a corresponding one of the master passages 50a, 50b which is located downstream of a corresponding one of the master cut-off valves 72a, 72b. The pumps 74L, 74R are provided in the respective pump passages 79L, 79R. In the present embodiment, as illustrated in FIG. 2, each of the master passages 50a, 50b bypasses a corresponding one of the pumps 74L, 74R and a corresponding one of the electromagnetic valve devices 78L, 78R to directly connect between a corresponding one of the pressure chambers 43a, 43b and a corresponding one of the brake cylinders 46L, 46R. Each of the pumps 74L, 74R and a corresponding one of the brake cylinders 46L, 46R are connected to each other by a portion of a corresponding one of the pump passages 79L, 79R and a portion of a corresponding one of the master passages 50a, 50b. In other words, the reservoir passage 79A and the pump passages 79L, 79R are formed so as to bypass the master cylinder 42 and the master cut-off valves 72a, 72b to supply the working liquid discharged from the pumps 74L, 74R, to the brake cylinders 46L, 46R.

Each of the pumps 74L, 74R pumps up the working liquid from the reservoir 44 and pressurizes and supplies the working liquid to the corresponding one of the brake cylinders 46L, 46R. Check valves 80L, 80R are provided on a discharge side of the respective pumps 74L, 74R to prevent backflow of the working fluid to the respective pumps 74L, 74R. In the present embodiment, each of the pumps 74L, 74R is a gear pump which damps pulsation. The pump motor 76 is a brushless motor connected to the auxiliary battery 49 via an inverter 81. The pump motor 76 is controlled by control for the inverter 81 to control operations of the pumps 74L, 74R.

Return passages 82L, 82R are defined such that each of the return passages 82L, 82R connects between (i) a portion of a corresponding one of the pump passages 79L, 79R or a corresponding one of the master passages 50a, 50b, which portion is located on a discharge side of a corresponding one of the pumps 74L, 74R (i.e., the portion located downstream of a corresponding one of the check valves 80L, 80R) and (ii) a portion of the reservoir passage 79A or a corresponding one of the pump passages 79L, 79R, which portion is located on a suction side of the corresponding one of the pumps 74L, 74R. The electromagnetic valve devices 78L, 78R are provided on the respective return passages 82L, 82R. The electromagnetic valve device 78L includes a normally-open linear valve 84L and a cut-off valve 85L as a normally-closed electromagnetic open/close valve which are provided in series. The electromagnetic valve device 78R includes a normally-open linear valve 84R and a cut-off valve 85R as a normally-closed electromagnetic open/close valve which are provided in series. For example, each of the cut-off valves 85L, 85R may be provided at a position nearer to the reservoir 44 than the corresponding one of the linear valves 84L, 84R. Continuous control of a current supplied to a solenoid of each of the linear valves 84L, 84R enables continuous control of a hydraulic pressure in a corresponding one of the brake cylinders 46L, 46R. Each of the cut-off valves 85L, 85R is switched to its open state when a current is supplied to its solenoid in a state in which the hydraulic pressure in the corresponding one of the brake cylinder 46L, 46R is controlled by the corresponding one of the linear valves 84L, 84R. In the other cases, since no current is supplied to the solenoid, each of the cut-off valves 85L, 85R is in its closed state to prevent the working liquid to flow out from the master cylinder 42 and the corresponding one of the brake cylinders 46L, 46R to the reservoir 44.

A stroke simulator 87 is connected, via a simulator control valve 86 as a normally-closed electromagnetic open/close valve, to a portion of the master passage 50a which is located upstream of the master cut-off valve 72a. Operations of the stroke simulator 87 are allowed in an open state of the simulator control valve 86.

As illustrated in FIG. 1, the electric braking device 34 includes: electric brakes 90L, 90R provided for the respective rear left and right wheels 10RL, 10RR; and the auxiliary battery 49 configured to supply electric power to electric motors 92L, 92R (see FIG. 4) of the respective electric brakes 90L, 90R. The auxiliary battery 49 is also a constituent element of the hydraulic braking device 32.

Figure 4:
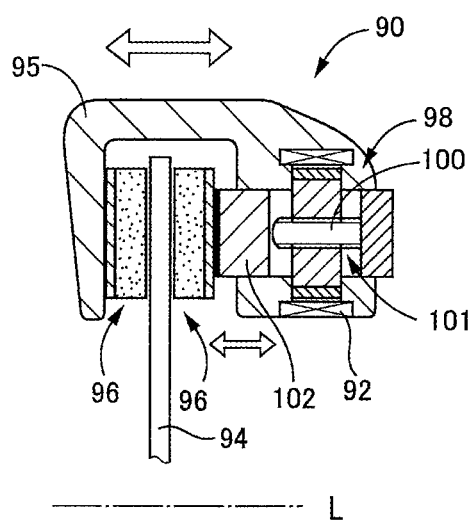
FIG. 4 is a cross-sectional view of an electric brake included in the brake system.

Each of the electric brakes 90 is a disc brake as a friction brake. As illustrated in FIG. 4, the electric brake 90 includes a disc rotor 94, a caliper 95, a pair of brake pads 96, and an electric actuator 98 provided on the caliper 95. The electric actuator 98 includes the electric motor 92, a plunger 100, and a screw mechanism 101 as a motion converter configured to convert rotation of the electric motor 92 to straight movement of the plunger 100 in its axial direction. Rotation of the electric motor 92 moves the plunger 100 forward in the direction parallel with the rotation axis L. This movement moves a piston 102 forward to move the caliper 95. As a result, the brake pads 96 are pressed against and frictionally engaged with the disc rotor 94. That is, the electric brake 90 is actuated to reduce rotation of the rear wheel 10R.

The present brake system includes a brake ECU 118 and the motor ECUs 120L, 120R (each expressed as "EM-ECU" in FIG. 1). The brake ECU 118 and the motor ECUs 120L, 120R are communicable with each other. The brake ECU 118 principally controls the regenerative braking device 30 and the hydraulic braking device 32. The motor ECUs 120L, 120R control the respective electric motors 92L, 92R of the electric braking device 34. The electric motors 92L, 92R are connected to the respective motor ECUs 120L, 120R via respective drive circuits, not illustrated. Control of the drive circuits by the respective motor ECUs 120L, 120R controls the respective electric motors 92L, 92R.

Each of the brake ECU 118 and the motor ECUs 120L, 120R is principally constituted by a computer and includes an executer 121, a storage 122, and an input/output interface 123. It is noted that FIG. 1 omits illustration of the executers, the storages, and the input/output interfaces of the motor ECUs 120L, 120R. Devices connected to the input/output interface 123 of the brake ECU 118 include a stroke sensor 130, master-cylinder-pressure sensors 132a, 132b, brake-cylinder-pressure sensors 134L, 134R, wheel speed sensors 136, a rotation-speed sensor 138, a current sensor 140, a voltage sensor 142, a remaining-power sensor 144, a temperature sensor 146, the regenerative braking device 30 (including the inverters 26G, 26M), and the hydraulic braking device 32 (including the electromagnetic valve devices 78L, 78R, the master cut-off valves 72a, 72b, the simulator control valve 86, and the inverter 81).

The stroke sensor 130 is configured to detect a stroke of the brake pedal 40 depressed by the driver. Each of the master-cylinder-pressure sensors 132a, 132b detects a hydraulic pressure in a corresponding one of the pressure chambers 43a, 43b of the master cylinder 42. Based on a value output from the stroke sensor 130 and values output from the master-cylinder-pressure sensors 132a, 132b, an operation state of the brake pedal 40 operable by the driver is obtained, and a driver-requested brake force as a requested brake force intended by the driver is obtained. It is noted that the stroke sensor 130 may be replaced with a foot-power sensor configured to detect foot power as an operating force applied to the brake pedal 40.

The wheel speed sensors 136 are configured to detect rotational speeds of the respective front left and right and rear left and right wheels 10FL, 10FR, 10RL, 10RR. A running speed of the vehicle is obtained based on the rotational speeds of the respective wheels 10FL, 10FR, 10RL, 10RR. The rotation-speed sensor 138 is configured to detect a rotation speed of the pump motor 76. The current sensor 140 is configured to detect a current flowing in the pump motor 76 and provided on the inverter 81 connected to the pump motor 76. In the present embodiment, the inverter 81 is controlled based on detection values of the rotation-speed sensor 138 and the current sensor 140 to control an operation state of the pump motor 76.

The voltage sensor 142 is configured to detect a voltage of the auxiliary battery 49. An amount of remaining power of the auxiliary battery 49 is larger when the voltage is high than when the voltage is low. The remaining-power sensor 144 is configured to detect a remaining power of the main battery 28. The regenerative brake force is controlled with consideration of the remaining power of the main battery 28. The temperature sensor 146 is configured to detect an outside-air temperature. A temperature of the working liquid in the hydraulic braking device 32 is estimated based on the outside-air temperature.

The brake system configured as described above executes cooperative control. In the cooperative control, the regenerative braking device 30, the hydraulic braking device 32, and the electric braking device 34 are controlled such that a total requested brake force Fref as a brake force requested in the brake system is satisfied by (i) a regenerative brake force FrL and a hydraulic brake force FhL produced for the front left wheel 10FL, (ii) a regenerative brake force FrR and a hydraulic brake force FhR produced for the front right wheel 10FR, and (iii) electric brake forces FeL, FeR respectively produced for the rear left and right wheels 10RL, 10RR.

For example, the brake ECU 118 obtains the above-described driver-requested brake force as the total requested brake force Fref. Also, the brake ECU 118 obtains the largest regenerative brake force Fr (which is the sum of the regenerative brake forces FrL, FrR applied to the respective front left and right wheels 10FL, 10FR) which can be produced based on remaining power of electric energy stored in the main battery 28, a rotational speed of the electric motor 13, and so on. The brake ECU 118 obtains a target regenerative brake force Frref based on the largest regenerative brake force Fr. The brake ECU 118 obtains target hydraulic brake forces FhrefL, FhrefR and target electric brake forces FerefL, FerefR based on a value obtained by subtracting the target regenerative brake force Frref from the total requested brake force Fref and a predetermined ratio (e.g., βh:βe) between a hydraulic brake force Fh and an electric brake force Fe. The target hydraulic brake forces FhrefL, FhrefR are a target value of the hydraulic brake force Fh, and the target electric brake forces FerefL, FerefR are a target value of the electric brake force. In the cooperative control, as a principle, the target hydraulic brake forces FhrefL, FhrefR obtained for the respective front left and right wheels 10FL, 10FR are made equal to each other (FhrefL=FhrefR), and the target electric brake forces FerefL, FerefR obtained for the respective rear left and right wheels 10RL, 10RR are made equal to each other (FerefL=FerefR).

Information about the target electric brake forces FerefL, FerefR is output from the brake ECU 118 to the motor ECUs 120L, 120R. The motor ECUs 120L, 120R control the respective electric motors 92L, 92R such that actual electric brake forces FeL, FeR are brought closer to the respective target electric brake forces FerefL, FerefR. The brake ECU 118 controls the regenerative braking device 30 (e.g., the inverter 26M) such that the actual regenerative brake force Fr is brought closer to the target regenerative brake force Frref. Also, the brake ECU 118 controls the hydraulic braking device 32 (e.g., the hydraulic-pressure control unit 48) such that actual hydraulic brake forces FhL*, FhR* produced for the respective front left and right wheels 10FL, 10FR are brought closer to the respective target hydraulic brake forces FhrefL, FhrefR.

In the present embodiment, in the case where a degree of slip of the wheels becomes larger in the cooperative control, and thereby an anti-lock-control initiating condition is satisfied, the cooperative control is terminated, and anti-lock control is executed by controlling the hydraulic braking device 32. The hydraulic braking device 32 is controlled without the cooperative control in the case where the vehicle stability control is executed or in the case where automatic brake (e.g., for example, automatic brake for collision avoidance) is activated, for example. In the case where slip reduction control such as the anti-lock control and vehicle stability control is executed or in the case where the automatic brake is activated, for example, the target hydraulic brake forces FhrefL, FhrefR are obtained for the respective front left and right wheels 10FL, 10FR in each control.

Figure 5:
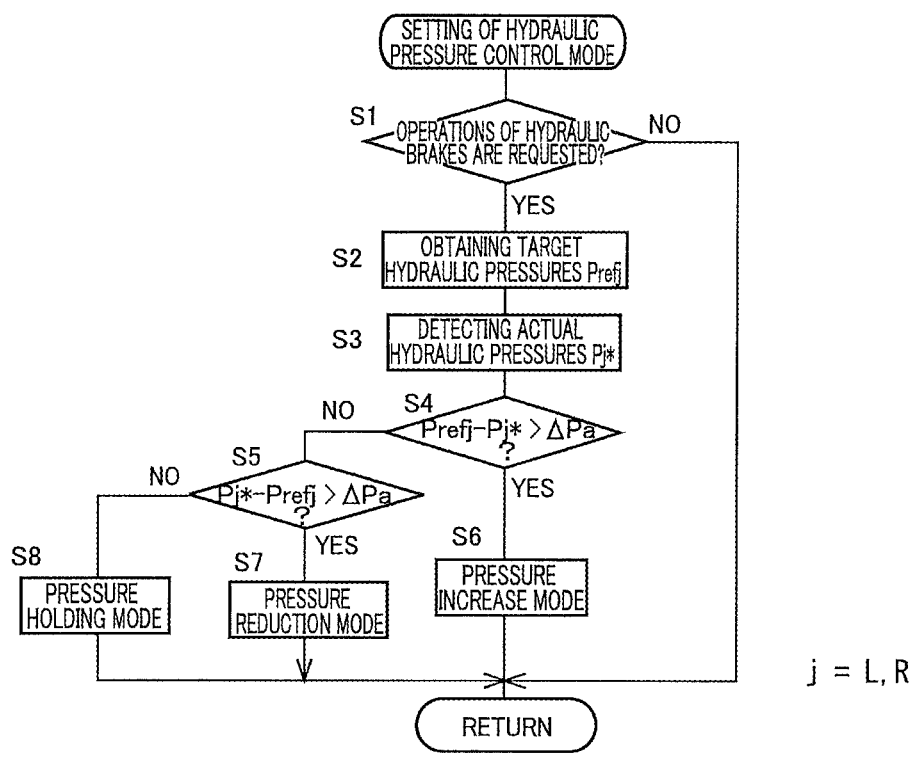
FIG. 5 is a flowchart conceptually representing a hydraulic-pressure-control-mode setting program stored in a storage of a brake ECU of the brake system.

In the present embodiment, the brake ECU 118 executes a hydraulic-pressure-control-mode setting program represented by the flowchart in FIG. 5 each time when a predetermined length of time is elapsed. The brake ECU 118 controls the hydraulic braking device 32 based on a set control mode. In the present embodiment, the control mode is set for each of the brake cylinders 46L, 46R. In the case where the brake system is normal, the hydraulic pressures in the respective brake cylinders 46L, 46R are controlled by control for the pump motor 76 and the respective linear valves 84L, 84R in a state in which the simulator control valve 86 is open, the master cut-off valves 72a, 72b are closed, and the cut-off valves 85L, 85R are open.

The flow in FIG. 5 begins with S1 at which it is determined whether operations of the hydraulic brakes 38L, 38R are requested. It is determined that operations of the hydraulic brakes 38L, 38R are requested in the case where the cooperative control is to be executed, the slip reduction control is to be executed, or the automatic brake is to be activated, for example, as described above. When a positive decision (YES) is made at S1, target hydraulic pressures PrefL, PrefR of the brake cylinder 46 are at S2 obtained based on the respective target hydraulic brake forces FhrefL, FhrefR. The brake-cylinder-pressure sensors 134L, 134R at S3 respectively detect actual hydraulic pressures PL*, PR* which are actual hydraulic pressures in the brake cylinders. At S4 and S5, the target hydraulic pressures PrefL, PrefR and the respective actual hydraulic pressures PL*, PR* are compared with each other, and the control mode is set to one of a pressure increase mode, a pressure reduction mode, and a pressure holding mode at S6-S8.

For example, when a value obtained by subtracting each of the actual hydraulic pressures PL*, PR* from a corresponding one of the target hydraulic pressures PrefL, PrefR is greater than a set value ΔPa (PrefL−PL*>ΔPa, PrefR−PR*>ΔPa), the control mode is set to the pressure increase mode at S6. When a value obtained by subtracting each of the target hydraulic pressures PrefL, PrefR from a corresponding one of the actual hydraulic pressures PL*, PR* is greater than the set value ΔPa (PL*−PrefL>ΔPa, PR*−PrefR>ΔPa), the control mode is set to the pressure reduction mode at S7. When an absolute value of a difference between each of the actual hydraulic pressures PL*, PR* and the corresponding one of the target hydraulic pressures PrefL, PrefR is less than or equal to the set value (ΔPa≥|PL*−PrefL|, ΔPa≥|PR*−PrefR|), the control mode is set to the pressure holding mode at S8.

Figure 6:
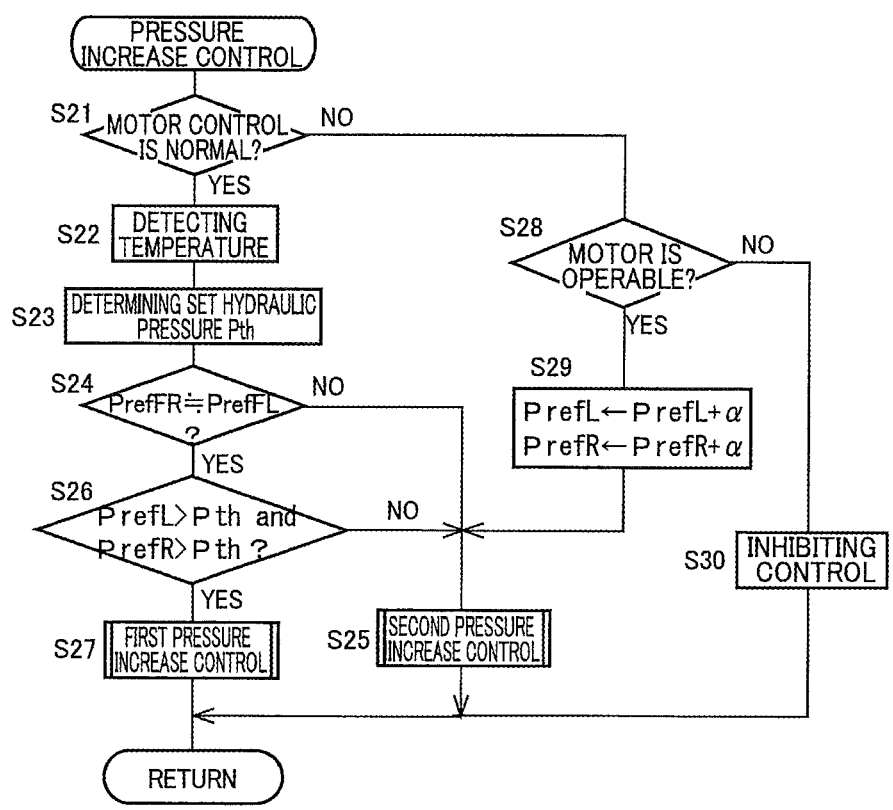
FIG. 6 is a flowchart conceptually representing a pressure-increase control program stored in the storage.

When the control mode is set to the pressure increase mode, a pressure-increase control program represented by the flowchart in FIG. 6 is executed. In the present embodiment, one of first pressure increase control and second pressure increase control is selectively executed. In the first pressure increase control, the hydraulic pressures PL*, PR* in the respective brake cylinders 46L, 46R are brought closer to the respective target hydraulic pressures PrefL, PrefR by controlling the pump motor 76 in closed states of the respective linear valves 84. In the second pressure increase control, the hydraulic pressures PL*, PR* in the respective brake cylinders 46L, 46R are brought closer to the respective target hydraulic pressures PrefL, PrefR by controlling the respective linear valves 84L, 84R while controlling the pump motor 76 such that the working liquid is supplied to the brake cylinders 46L, 46R by an amount greater than or equal to a necessary and sufficient amount at a flow rate greater than or equal to a necessary and sufficient flow rate.

In the first pressure increase control, the pump motor 76 is controlled in the closed states of the respective linear valves 84L, 84R such that the working fluid is supplied from each of the pumps 74L, 74R to the corresponding one of the brake cylinders 46L, 46R, by an amount required for a corresponding one of the actual hydraulic pressures PL*, PR* to be brought closer to a corresponding one of the target hydraulic pressures PrefL, PrefR for the corresponding one of the brake cylinders 46L, 46R, at a flow rate determined in accordance with an increase rate of the target hydraulic pressure Pref. In the present embodiment, the actual hydraulic pressure PL* in the brake cylinder 46L and the actual hydraulic pressure PR* in the brake cylinder 46R are substantially equal to each other, and the target hydraulic pressure PrefL for the brake cylinder 46L and the target hydraulic pressure PrefR for the brake cylinder 46R are substantially equal to each other (PL*≈PR*≈P*, PrefL≈PrefR≈Pref).

Figure 11:
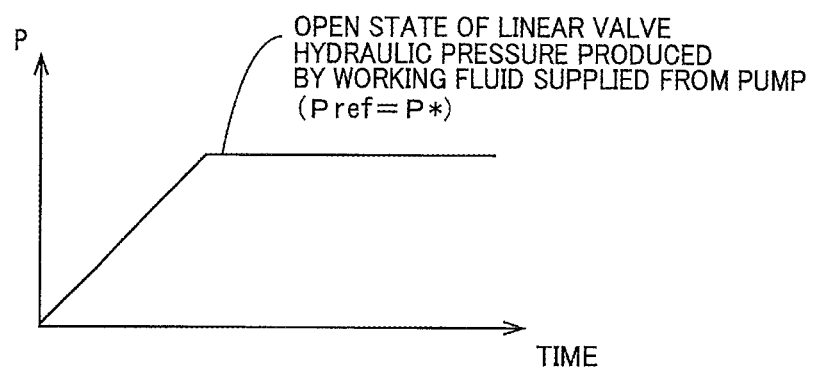
FIG. 11 is a view conceptually illustrating a relationship between a hydraulic pressure and a time of first pressure increase control executed in the brake system.

Thus, in the first pressure increase control, the pump motor 76 is controlled such that the working liquid is supplied from each of the pumps 74L, 74R to the corresponding one of the brake cylinders 46L, 46R only by an amount that is essential for the actual hydraulic pressure P* to be brought closer to the target hydraulic pressure Pref. Accordingly, as illustrated in FIG. 11, the hydraulic pressure P* in each of the brake cylinders 46L, 46R is increased, in accordance with increase in the target hydraulic pressure Pref, by the working liquid supplied from the corresponding one of the pumps 74L, 74R, resulting in good power efficiency with minimum wastage of electric power. Since the inertia of the pump motor 76 is large, however, it is difficult to minutely and accurately control the hydraulic pressure in the brake cylinder 46, making it difficult to achieve good controllability. Since the two pumps 74L, 74R are controlled by the single pump motor 76, the hydraulic pressures in the respective brake cylinders 46L, 46R are controlled in the same manner.

In the second pressure increase control, the pump motor 76 is controlled such that the working fluid is discharged from each of the pumps 74L, 74R, by an amount greater than an amount required for the corresponding one of the actual hydraulic pressures PL*, PR* of the respective brake cylinders 46FL, FR to reach a higher target hydraulic pressure MAX (PrefL, PrefR), which is a higher one of the target hydraulic pressures PrefL, PrefR, at a flow rate greater than a flow rate determined based on an increase rate of the higher target hydraulic pressure MAX (PrefL, PrefR). Furthermore, the linear valves 84L, 84R are controlled such that the actual hydraulic pressures PL*, PR* in the respective brake cylinders 46L, 46R are brought into closer to the respective target hydraulic pressures PrefL, PrefR. In other words, each of the pumps 74L, 74R discharges the working liquid toward the corresponding one of the brake cylinders 46L, 46R by an amount greater than a necessary and sufficient amount, but the working liquid is partly returned to the reservoir 44 via the linear valves 84L, 84R, whereby the hydraulic pressures in the respective brake cylinders 46L, 46R are brought closer to the respective target hydraulic pressures PrefL, PrefR.

Figure 12:
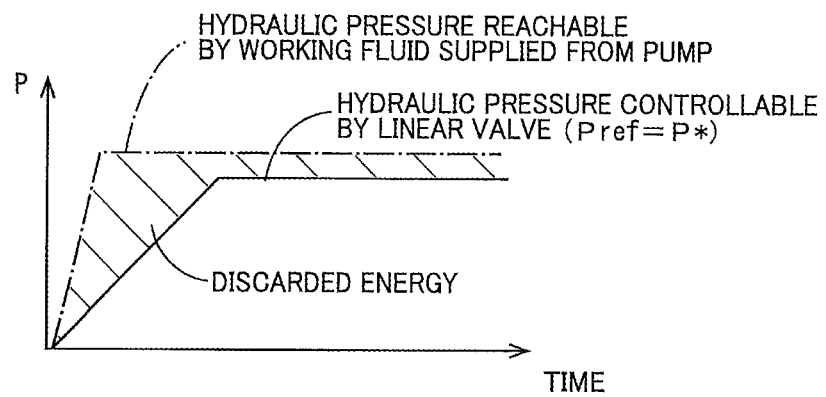
FIG. 12 is a view conceptually illustrating a relationship between a hydraulic pressure and a time of second pressure increase control executed in the brake system.

Accordingly, the hydraulic pressure controlled by each of the linear valves 84L, 84R (indicated by the solid line in FIG. 12) is lower than a hydraulic pressure produced by the working liquid supplied by the corresponding one of the pumps 74L, 74R (indicated by the one-dot chain line in FIG. 12). Energy corresponding to a difference between these hydraulic pressures (indicated by the hatched area in FIG. 12) is discarded. Thus, power efficiency is low in the second pressure increase control. However, since the inertia of each of the linear valves 84L, 84R is less than that of the pump motor 76, it is possible to accurately and minutely control the hydraulic pressures in the respective brake cylinders 46L, 46R, resulting in good controllability. In the present embodiment, both of the pump motor 76 and the linear valves 84L, 84R are controlled. This configuration enables independent control for the hydraulic pressures in the respective brake cylinders 46L, 46R.

As described above, the pump motor 76 is controlled based on the higher target hydraulic pressure MAX (PrefL, PrefR). In the present embodiment, the pump motor 76 is controlled such that the working liquid is discharged from each of the pumps 74L, 74R at the set flow rate greater than the flow rate determined based on the increase rate of the higher target hydraulic pressure MAX (PrefL, PrefR). In other words, the rotation speed of the pump motor 76 is controlled so as to be kept at a set rotation speed corresponding to the set flow rate.

In view of the circumstances described above, in the present embodiment, as a principle, the first pressure increase control is executed in the case where the target hydraulic pressures PrefL, PrefR determined for the respective brake cylinders 46L, 46R are substantially equal to each other, and the second pressure increase control is executed in the case where the target hydraulic pressures PrefL, PrefR are different from each other. For example, the first pressure increase control is executed in the case where the cooperative control is executed or in the case where the automatic brake is activated for collision avoidance, and the second pressure increase control is executed in the case where the slip reduction control such as the anti-lock control is executed. The second pressure increase control is also executed in the event of such a malfunction that the pump motor 76 can be operated, but it is difficult for the hydraulic pressures PL*, PR* in the respective brake cylinders 46 to be brought closer to the respective target hydraulic pressures PrefL, PrefR by control for the pump motor 76, for example. One example of such a malfunction is a malfunction in at least one of sensors (e.g., the rotation-speed sensor 138 and the current sensor 140) used for control for the pump motor 76. In the event of a malfunction in the rotation-speed sensor 138 and/or the current sensor 140, it is also difficult to accurately control the pump motor 76 based on the higher target hydraulic pressure MAX (PrefL, PrefR). To solve this problem, the target hydraulic pressure Pref is set to a value greater than a target hydraulic pressure obtained in, e.g., the cooperative control, the slip reduction control, and operation of the automatic brake (noted that this target hydraulic pressure may be referred to as "true target hydraulic pressure"). This configuration reduces shortage of the hydraulic pressure due to the malfunction in the rotation-speed sensor 138 and/or the current sensor 140, for example.

Even in the case where the target hydraulic pressures PrefL, PrefR are substantially equal to each other, when at least one of the target hydraulic pressures PrefL, PrefR is lower than a set hydraulic pressure Pth, the second pressure increase control is executed. This is because it is difficult to accurately control the hydraulic pressure in the brake cylinder 46 to a low value in the first pressure increase control. The set hydraulic pressure Pth may be set to such a value that makes it difficult to execute the first pressure increase control.

Figure 7:
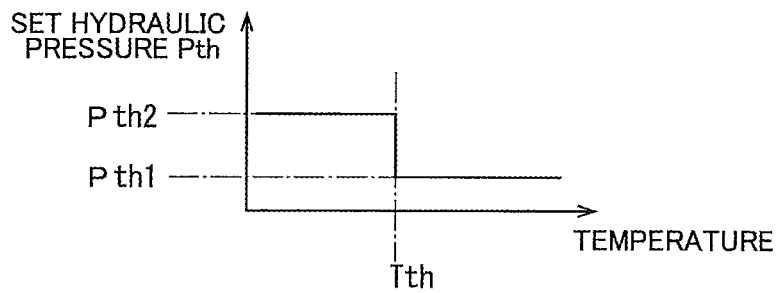
FIG. 7 is a view conceptually illustrating a relationship between a threshold value and a temperature stored in the storage.

As illustrated in FIG. 7, the set hydraulic pressure Pth may be set to a value that is greater in the case where a temperature of the working liquid is low than in the case where the temperature of the working liquid is high. For example, a response is deteriorated in the case where the viscosity of the working liquid is high due to a low temperature of the working liquid. In contrast, it is possible to achieve a better response in the second pressure increase control than in the first pressure increase control. Thus, in the present embodiment, a set hydraulic pressure Pth2 used when the temperature of the working liquid is lower than a set temperature Tth is set to a value greater than a set hydraulic pressure Pth1 used when the temperature of the working liquid is greater than or equal to the set temperature (Pth2>Pth1). The set temperature Tth is a temperature estimated to cause high viscosity. It is noted that the temperature of the working liquid may be estimated based on the outside-air temperature detected by the temperature sensor 146, for example, it is possible to estimate that the temperature of the working liquid is substantially equal to the outside-air temperature.

At S21, it is determined whether or not the pump motor 76 and the inverter 81, or the rotation-speed sensor 138 and the current sensor 140 are normal. When a positive decision (YES) is made at S21, the temperature sensor 146 at S22 detects the outside-air temperature to estimate the temperature of the working liquid. The set hydraulic pressure Pth is at S23 determined based on the temperature of the working liquid according to the relationship in FIG. 7. It is determined at S24 whether the target hydraulic pressures PrefL, PrefR are substantially equal to each other. When a negative decision (NO) is made at S24, the second pressure increase control is executed at S25. When the target hydraulic pressures PrefL, PrefR are substantially equal to each other, it is determined at S26 whether each of the target hydraulic pressures PrefL, PrefR is greater than the set hydraulic pressure Pth determined at S23. When a positive decision (YES) is made at S26, the first pressure increase control is executed at S27. When a negative decision (NO) is made at S26, the second pressure increase control is executed at S25. Since the two target hydraulic pressures PrefL, PrefR are substantially equal to each other, one of the two target hydraulic pressures PrefL, PrefR and the set hydraulic pressure Pth may be compared with each other at S26.

When a negative decision (NO) is made at S21, it is determined at S28 whether the pump motor 76 is operable. In the event of a malfunction in any of the rotation-speed sensor 138 and the current sensor 140, for example, the pump motor 76 is operable, and a positive decision (YES) is made at S28. At S29, values each obtained by adding a correction value $\alpha$ to a corresponding one of the true target hydraulic pressures PrefL, PrefR are respectively set to control target hydraulic pressures (PrefL+$\alpha$, PrefR+$\alpha$) which are to be used in control. The second pressure increase control is then executed at S25 based on the control target hydraulic pressures (PrefL+$\alpha$, PrefR+$\alpha$). When a negative decision (NO) is made at S28, control for the hydraulic-pressure control unit 48 is inhibited at S30. As a result, no current is supplied to the hydraulic-pressure control unit 48, so that the devices of the hydraulic-pressure control unit 48 are positioned at their respective original positions illustrated in FIG. 2. The brake cylinders 46L, 46R are isolated from the reservoir 44 and communicate with the respective pressure chambers 43a, 43b of the master cylinder 42, and the hydraulic brakes 38L, 38R are operated by a hydraulic pressure in the master cylinder 42. Thus, the brake cylinder 46L and the brake cylinder 46R independently communicate with the respective pressure chambers 43a, 43b, so that the brake system has two lines for the respective front left and right wheels 10FL, 10FR in the present embodiment.

In the present embodiment as described above, the pumps 74L, 74R are respectively connected to the brake cylinders 46L, 46R provided for the respective front left and right wheels, and these pumps 74L, 74R are driven by the single pump motor 76 in common. Also, in the brake system including the electromagnetic valve devices 78L, 78R, when the pressure increase control is executed, one of the first pressure increase control and the second pressure increase control is selectively executed based on the state of the brake system, i.e., based on the magnitude of the target hydraulic pressure for the brake cylinder 46, the presence or absence of the slip reduction control, and the presence or absence of the malfunction in the sensors, for example. With this configuration, even in the case where the single pump motor 76 is provided, it is possible to achieve good power efficiency and good controllability. In the case where the temperature of the working liquid is low, the set hydraulic pressure Pth is set to a large value, resulting in increase in opportunity of selection of the second pressure increase control. This reduces lowering of the response due to increase in viscosity of the working fluid, which increase is caused by a low temperature of the working liquid.

In the case where pressure-reduction control is executed for both of the front left and right wheels 10FL, 10FR, the hydraulic pressures in the respective brake cylinders 46 may be lowered by stopping the pump motor 76 and controlling the linear valves 84, for example. In the case where holding control is executed for both of the front left and right wheels 10FL, 10FR, the hydraulic pressures in the respective brake cylinders 46 may be held by stopping the pump motor 76 and closing the linear valves 84 and may be held by operating the pump motor 76 at a relatively low rotation speed and keeping the linear valves 84 open by a relatively small amount, for example.

In the present embodiment as described above, a brake-hydraulic-pressure controller is constituted by portions of the brake ECU 118 which store and execute the hydraulic-pressure-control-mode setting program represented by the flowchart in FIG. 5 and the pressure-increase control program represented by the flowchart in FIG. 6, for example. A first pressure-increase controller is constituted by portions of the brake-hydraulic-pressure controller which store and execute the processing at S27 in the pressure-increase control program represented by the flowchart in FIG. 6, for example. A second pressure-increase controller is constituted by portions of the brake-hydraulic-pressure controller which store and execute the processings at S25, S29, for example. A target-hydraulic-pressure determiner is constituted by portions of the brake-hydraulic-pressure controller which store and execute the processing at S29, for example. An electromagnetic-valve controller is constituted by portions of the brake-hydraulic-pressure controller which store and execute the processing at S25, for example. The first pressure-increase controller is constituted by a portion of the brake ECU 118 which executes the first pressure increase control, for example. The second pressure-increase controller is constituted by a portion of the brake ECU 118 which executes the second pressure increase control, for example. It is noted that the target hydraulic pressure determined at S29 is the control target hydraulic pressure that is determined to a value greater than the true target hydraulic pressure (i.e., the hydraulic pressure determined based on, e.g., purposes of the regenerative cooperative control, the slip reduction control, an operation of the automatic brake) determined in the regenerative cooperative control, the slip reduction control, and the operation of the automatic brake. The higher target hydraulic pressure MAX (PrefL, PrefR) is one example of the greatest one of the target hydraulic pressures for the respective brake cylinders. A controller selector is constituted by portions of the brake-hydraulic-pressure controller which store and execute the processings at S21-S24, S26, and S28.

Second Embodiment

While the set hydraulic pressure Pth is determined based on the temperature of the working liquid in the above-described embodiment, the present disclosure is not limited to this configuration. For example, the set hydraulic pressure Pth may be determined based on the voltage of the auxiliary battery 49 as a power source configured to supply electric power to the pump motor 76. In the case where the voltage of the auxiliary battery 49 is low, a remaining amount of electric power (available charges) stored in the auxiliary battery 49 is smaller than in the case where the voltage of the auxiliary battery 49 is high, making it difficult to stably supply electric power. In the first pressure increase control, power efficiency is high. To eliminate the difficulty of the stable supply of the electric power, in the present embodiment, the set hydraulic pressure Pth is lower in the case where the voltage of the auxiliary battery 49 is low than in the case where the voltage of the auxiliary battery 49 is high. Specifically, a set hydraulic pressure Pth3 used in the case where the voltage of the auxiliary battery 49 is lower than a set voltage Vth is set to a value less than a set hydraulic pressure Pth4 used in the case where the voltage of the auxiliary battery 49 is higher than or equal to the set voltage Vth (Pth3<Pth4). For example, the set voltage Vth may be set based on such a voltage that there is a high possibility of difficulty in stable supply of electric power due to a small amount of remaining power.

Figure 10:
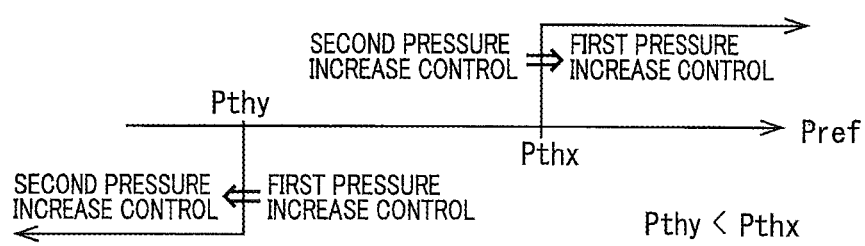
FIG. 10 is a view conceptually illustrating execution of the pressure-increase control program.

In the present embodiment, hysteresis is provided in switch between the first pressure increase control and the second pressure increase control. As conceptually illustrated in FIG. 10, the first pressure increase control is executed in the case where each of the target hydraulic pressures PrefL, PrefR is higher than a first set hydraulic pressure Pthx, and the control is switched from the first pressure increase control to the second pressure increase control in the case where at least one of the target hydraulic pressures PrefL, PrefR becomes lower than a second set hydraulic pressure Pthy that is less than the first set hydraulic pressure Pthx. The second pressure increase control is executed in the case where at least one of the target hydraulic pressures PrefL, PrefR is lower than the second set hydraulic pressure Pthy. When each of the target hydraulic pressures PrefL, PrefR becomes higher than the first set hydraulic pressure Pthx, the control is switched from the second pressure increase control to the first pressure increase control.

Figure 8:
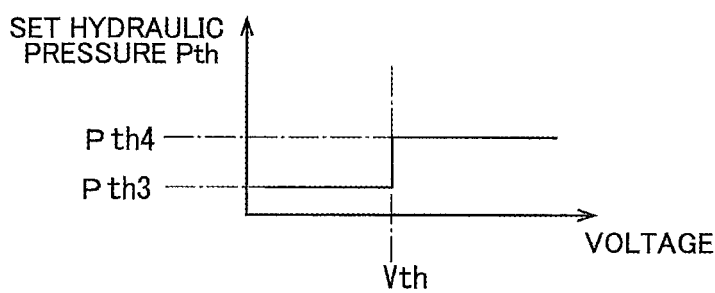
FIG. 8 is a view conceptually illustrating a relationship between a threshold value and a voltage stored in a storage of a brake ECU of a brake system according to a second embodiment.
Figure 9:
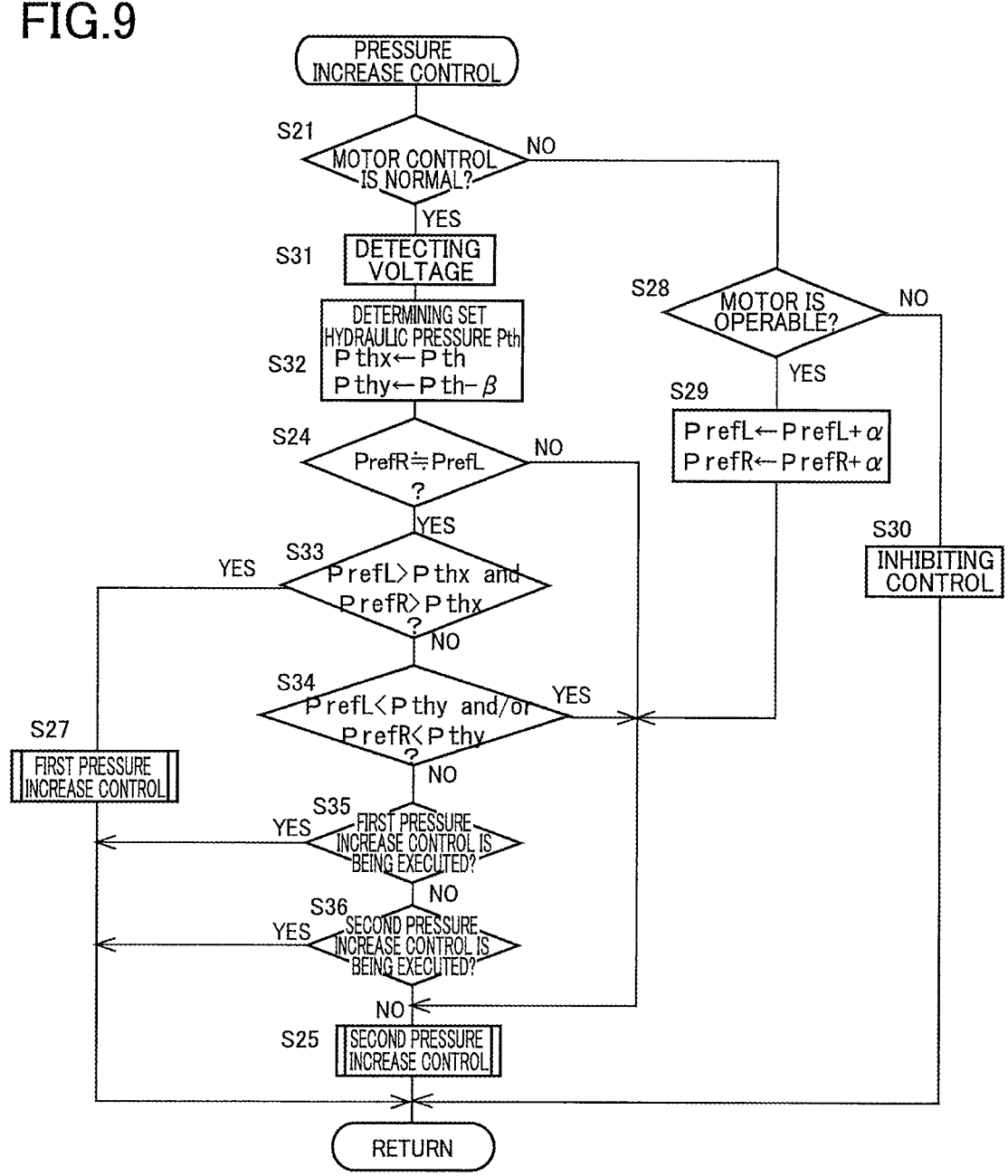
FIG. 9 is a flowchart conceptually representing a pressure-increase control program stored in the storage.

A pressure-increase control program represented by the flowchart in FIG. 9 is executed each time when a set length of time is elapsed. The same step numbers as used in the flowchart in FIG. 6 are used to designate the corresponding steps in the flowchart in FIG. 9, and an explanation of which is dispensed with. At S31, the voltage sensor 142 detects the voltage of the auxiliary battery 49. At S32, the set hydraulic pressure Pth is determined based on the detected voltage and the relationship illustrated in FIG. 8. The determined set hydraulic pressure Pth is set as the first set hydraulic pressure Pthx, and a value less than the set hydraulic pressure Pth by ß (ß>0) is set as the second set hydraulic pressure Pthy (Pthx=Pth, Pthy=Pth−ß).

It is determined at S33 whether each of the target hydraulic pressures PrefL, PrefR is higher than the first set hydraulic pressure Pthx. It is determined at S34 whether at least one of the target hydraulic pressures PrefL, PrefR is lower than the second set hydraulic pressure Pthy. When a positive decision (YES) is made at S33, the first pressure increase control is executed at S27. When a positive decision (YES) is made at S34, the second pressure increase control is executed at S25. When negative decisions (NO) are made at S33 and S34, it is determined at S35 whether the first pressure increase control is being executed. When a negative decision is made at S35, it is determined at S36 whether the second pressure increase control is being executed. When the first pressure increase control or the second pressure increase control is being executed, the control being executed is continued. When neither of the first pressure increase control nor the second pressure increase control is being executed, the second pressure increase control is executed at S25.

In the present embodiment as described above, in the case where the voltage of the auxiliary battery 49 is low, the first pressure increase control is easily selected, thereby lowering a speed of reduction in the remaining power of the auxiliary battery 49. Also, since hysteresis is provided in the switch between the first pressure increase control and the second pressure increase control, it is possible to avoid frequent switches between the first pressure increase control and the second pressure increase control.

It is noted that the method of determination of the set hydraulic pressure Pth is not limited to that in each of the above-described embodiments. For example, while the set hydraulic pressure Pth is set to a value which changes stepwise in accordance with changes in the temperature of the working liquid or the voltage of the auxiliary battery 49 in the above-described embodiments, the set hydraulic pressure Pth may be set to a value which changes continuously.

The set hydraulic pressure Pth may be set based on both of the temperature of the working liquid and the voltage of the auxiliary battery 49 and may be a value determined independently of the temperature of the working liquid and the voltage of the auxiliary battery 49.

The control for the pump motor 76 in the first pressure increase control and the second pressure increase control is not limited to that in the above-described embodiments. For example, feedback control may be executed based on detection values of the respective brake-cylinder-pressure sensors 134L, 134R instead of the feedforward control executed based on the required amount of the liquid in each of the brake cylinders 46.

It is not essential that the present brake system is installed in a hybrid vehicle. For example, the present brake system may be installed in a vehicle in which a hydraulic brake force is applied to front left and right and rear left and right wheels. In this case, the first pressure increase control may be executed in the case where the hydraulic braking device is controlled such that a requested brake force intended by the driver is satisfied by the hydraulic brake force.

The first pressure increase control may be executed not only in the case where the target hydraulic pressures PrefL, PrefR in the respective brake cylinders 46L, 46R are substantially equal to each other but also in the case where the increase rates ΔPrefL, ΔPrefR of the respective target hydraulic pressures are substantially equal to each other. It is to be understood that the disclosure is not limited to the details of the illustrated embodiments, but may be embodied with various changes and modifications, which may occur to those skilled in the art, without departing from the spirit and scope of the disclosure.

CLAIMABLE INVENTIONS

There will be described forms of inventions recognized to be claimable in the present disclosure by way of example.

(1) A brake system, comprising:
a plurality of brake cylinders;
a plurality of electromagnetic valve devices provided respectively corresponding to the brake cylinders and capable of individually controlling hydraulic pressures in the respective brake cylinders;
a plurality of pumps respectively connected to the brake cylinders;
one pump motor driven in common with the pumps; and
a brake-hydraulic-pressure controller configured to control the electromagnetic valve devices and the one pump motor to control a brake hydraulic pressure that is each of the hydraulic pressures in the respective brake cylinders,
wherein the brake-hydraulic-pressure controller comprises:
a first pressure-increase controller configured to control the one pump motor to bring the hydraulic pressures in the respective brake cylinders closer to respective target hydraulic pressures; and
a second pressure-increase controller configured to control the one pump motor based on a greatest one of the target hydraulic pressures for the respective brake cylinders and control the electromagnetic valve devices to bring the hydraulic pressures in the respective brake cylinders closer to the respective target hydraulic pressures.

The electromagnetic valve device may include at least one electromagnetic valve. The wordings "control the pump motor based on a greatest one of the target hydraulic pressures for the respective brake cylinders" in the feature of the second pressure-increase controller means that the working liquid is discharged from the pump, by an amount greater than a liquid amount necessary and sufficient for an actual hydraulic pressure to be brought closer to the target hydraulic pressure in each of the plurality of brake cylinders, at a flow rate greater than a necessary and sufficient flow rate determined based on an increase rate of the target hydraulic pressure. For example, the pump motor may be rotated at a constant speed.

(2) The brake system according to the above form (1), wherein the brake-hydraulic-pressure controller comprises a controller selector configured to select one of the first pressure-increase controller and the second pressure-increase controller based on a state of the brake system.

The state of the brake system may be represented by any of a state of control for the hydraulic pressure in each of the brake cylinders, the magnitude of each of the target hydraulic pressures, a remaining power (voltage) of a battery of the brake system, and a temperature of working liquid, for example.

(3) The brake system according to the above form (2), wherein the controller selector is configured to:

select the first pressure-increase controller when the target hydraulic pressures for the respective brake cylinders are equal to each other; and select the second pressure-increase controller when the target hydraulic pressures for the respective brake cylinders are different from each other.

The wordings "the target hydraulic pressures for the respective brake cylinders are equal to each other" mean that the target hydraulic pressures are substantially equal to each other. The wordings "the target hydraulic pressures for the respective brake cylinders are different from each other" means that the target hydraulic pressures are not substantially equal to each other.

(4) The brake system according to the above form (2) or (3), wherein the controller selector is configured to:

select the first pressure-increase controller when the target hydraulic pressures for the respective brake cylinders are equal to each other, and each of the target hydraulic pressures for the respective brake cylinders is greater than a set hydraulic pressure; and select the second pressure-increase controller when at least one of the target hydraulic pressures for the respective brake cylinders is less than or equal to the set hydraulic pressure.

The first pressure-increase controller is selected when each of the target hydraulic pressures for the respective brake cylinders is higher than the set hydraulic pressure. The second pressure-increase controller is selected when at least one of the target hydraulic pressures for the respective brake cylinders is less than or equal to the set hydraulic pressure. It is noted that, since the target hydraulic pressures for the respective brake cylinders are substantially equal to each other, the set hydraulic pressure and a representative value for the target hydraulic pressures (e.g., an average value of the target hydraulic pressures, the highest one of the target hydraulic pressures, and the lowest one of the target hydraulic pressures) may be compared with each other.

(5) The brake system according to the above form (4), wherein the controller selector comprises a set-hydraulic-pressure determiner configured to determine the set hydraulic pressure based on at least one of a temperature of working liquid in the brake system and a voltage of a power source configured to supply electric power to at least the one pump motor.

(6) The brake system according to the above form (5), wherein the set-hydraulic-pressure determiner is configured to determine the set hydraulic pressure to a value that is greater when the temperature of the working liquid is low than when the temperature of the working liquid is high.

The temperature of the working liquid may be detected directly and may be estimated based on an outside-air temperature. A low temperature of the working liquid deteriorates a response. Thus, the set hydraulic pressure is preferably set to a high value such that the second pressure-increase controller is easily selected.

(7) The brake system according to the above form (5) or (6), wherein the power source comprises a battery, and wherein the set-hydraulic-pressure determiner is configured to determine the set hydraulic pressure to a value that is less when the voltage of the power source is low than when the voltage of the power source is high.

The voltage is low in the case where an amount of electric energy stored in the battery is small. Thus, to reduce power consumption of the battery, the set hydraulic pressure is preferably set to a lower value when the voltage is low than the voltage is high, such that the first pressure-increase controller is easily selected.

(8) The brake system according to any one of the above forms (2) through (7), wherein the controller selector is configured to:

select the second pressure-increase controller when the target hydraulic pressures for the respective brake cylinders are equal to each other, and at least one of increase rates of the target hydraulic pressures for the respective brake cylinders is greater than a set rate; and select the first pressure-increase controller when each of the increase rates of the target hydraulic pressures for the respective brake cylinders is less than or equal to the set rate.

A better response is achieved in control executed by the second pressure-increase controller than in control executed by the first pressure-increase controller. Thus, the second pressure-increase controller is preferably selected when the increase rate of the target hydraulic pressure is greater than the set rate.

(9) The brake system according to any one of the above forms (2) through (8), wherein the controller selector is configured to select the second pressure-increase controller in a case of a malfunction in at least one sensor that is used in control for the one pump motor.

The pump motor is controlled based on detection values of sensors including: a rotation-speed sensor configured to detect a rotation speed of the pump motor; and a current sensor provided in an inverter and configured to detect a current flowing in the pump motor. In the event of a malfunction in at least one of the rotation-speed sensor and the current sensor, the second pressure-increase controller is selected, and the hydraulic pressures in the respective brake cylinders are principally controlled by control for the electromagnetic valve devices.

(10) The brake system according to the above form (9), wherein the second pressure-increase controller comprises a target-hydraulic-pressure determiner configured to determine each of the target hydraulic pressures for the respective brake cylinders to a value that is greater in a case of a malfunction in the at least one sensor than in a case of no malfunction in the at least one sensor.

There is a possibility that accuracy of control for the hydraulic pressure in the brake cylinder lowers due to a malfunction in the at least one sensor, leading to shortage of the hydraulic pressure. To solve this problem, in the event of a malfunction in the at least one sensor, the target hydraulic pressure is determined to a large value. The target hydraulic pressure determined in the event of a malfunction in the at least one sensor, i.e., a value that is greater than a value used in the case of no malfunction in the at least one sensor may be referred to as "control target hydraulic pressure".

(11) The brake system according to any one of the above forms (1) through (10), wherein the second pressure-increase controller is configured to control the one pump motor to keep a rotation speed of each of the pumps constant.

In the case where the rotation speed of the pump motor is substantially constant, the rotation speed of the pump is also substantially constant.

(12) The brake system according to any one of the above forms (1) through (11), wherein the brake-hydraulic-pressure controller comprises a feedforward controller configured to control at least one of the pump motor and the electromagnetic valve devices based on a required amount of working liquid to supply the required amount of the working liquid to each of the brake cylinders, and wherein the required amount of working liquid is an amount required for an actual hydraulic pressure to be brought closer to the target hydraulic pressure in each of the brake cylinders.

(13) The brake system according to any one of the above forms (1) through (12), wherein the brake-hydraulic-pressure controller comprises a brake-cylinder-pressure sensor configured to detect the hydraulic pressures in the respective brake cylinders, and wherein the brake-hydraulic-pressure controller comprises a feedback controller configured to control at least one of the pump motor and the electromagnetic valve devices such that the hydraulic pressures detected by the brake-cylinder-pressure sensor are brought closer to the respective target hydraulic pressures.

Either of the feedforward control or the feedback control may be executed, but the feedforward control may improve the response. The feedforward control and the feedback control may be combined with each other.

(14) The brake system according to any one of the above forms (1) through (13), wherein each of the electromagnetic valve devices comprises at least one electromagnetic valve each provided between a reservoir and a corresponding one of the brake cylinders, and wherein the second pressure-increase controller comprises an electromagnetic-valve controller configured to bring the hydraulic pressures in the respective brake cylinders closer to the respective target hydraulic pressures by controlling a current to be supplied to at least one solenoid of the at least one electromagnetic valve of each of the electromagnetic valve devices.

A current supplied to the solenoid of the electromagnetic valve is controlled to control an amount of opening of the electromagnetic valve. The working liquid flows from the brake cylinder to the reservoir at a rate that is greater when the amount of opening is large than when the amount of opening is small. The working liquid discharged from the pump flows to the reservoir via the electromagnetic valve. In the case where the flow rate of the working liquid discharged by the pump is greater than that of the working liquid flowing to the reservoir via the brake cylinder, the hydraulic pressure in the brake cylinder is high.

(15) The brake system according to any one of the above forms (1) through (14), wherein each of the electromagnetic valve devices comprises at least one electromagnetic valve each provided between a reservoir and a corresponding one of the brake cylinders, and wherein the first pressure-increase controller is configured to control the one pump motor in a state in which at least one of the at least one electromagnetic valve is closed in each of the electromagnetic valve devices.

The hydraulic pressure in the brake cylinder is increased by the working liquid supplied from the pump in a state in which the working liquid is inhibited from flowing from the brake cylinder to the reservoir. This configuration reduces needless loss of electric power in driving of the pump motor.

What is claimed is:

1. A brake system, comprising:
   a plurality of brake cylinders;
   a plurality of electromagnetic valve devices provided respectively corresponding to the brake cylinders and capable of individually controlling hydraulic pressures in the respective brake cylinders;
   a plurality of pumps respectively connected to the brake cylinders;
   one pump motor driven in common with the pumps; and
   a brake-hydraulic-pressure controller configured to control the electromagnetic valve devices and the one pump motor to control a brake hydraulic pressure that is each of the hydraulic pressures in the respective brake cylinders,
   wherein the brake-hydraulic-pressure controller comprises:
      a first pressure-increase controller configured to control the one pump motor to bring the hydraulic pressures in the respective brake cylinders closer to respective target hydraulic pressures; and
      a second pressure-increase controller configured to control the one pump motor based on a greatest one of the target hydraulic pressures for the respective brake cylinders and control the electromagnetic valve devices to bring the hydraulic pressures in the respective brake cylinders closer to the respective target hydraulic pressures.

2. The brake system according to claim 1, wherein the brake-hydraulic-pressure controller comprises a controller selector configured to select one of the first pressure-increase controller and the second pressure-increase controller based on a state of the brake system.

3. The brake system according to claim 2, wherein the controller selector is configured to:
   select the first pressure-increase controller when the target hydraulic pressures for the respective brake cylinders are equal to each other; and
   select the second pressure-increase controller when the target hydraulic pressures for the respective brake cylinders are different from each other.

4. The brake system according to claim 2, wherein the controller selector is configured to:
   select the first pressure-increase controller when the target hydraulic pressures for the respective brake cylinders are equal to each other, and each of the target hydraulic pressures for the respective brake cylinders is greater than a set hydraulic pressure; and
   select the second pressure-increase controller when at least one of the target hydraulic pressures for the respective brake cylinders is less than or equal to the set hydraulic pressure.

5. The brake system according to claim 4, wherein the controller selector comprises a set-hydraulic-pressure determiner configured to determine the set hydraulic pressure based on at least one of a temperature of working liquid in the brake system and a voltage of a power source configured to supply electric power to at least the one pump motor.

6. The brake system according to claim 5, wherein the set-hydraulic-pressure determiner is configured to determine the set hydraulic pressure to a value that is greater when the temperature of the working liquid is low than when the temperature of the working liquid is high.

7. The brake system according to claim 5,
wherein the power source comprises a battery, and
wherein the set-hydraulic-pressure determiner is configured to determine the set hydraulic pressure to a value that is less when the voltage of the power source is low than when the voltage of the power source is high.

8. The brake system according to claim 2, wherein the controller selector is configured to select the second pressure-increase controller in a case of a malfunction in at least one sensor that is used in control for the one pump motor.

9. The brake system according to claim 8, wherein the second pressure-increase controller comprises a target-hydraulic-pressure determiner configured to determine each of the target hydraulic pressures for the respective brake cylinders to a value that is greater in a case of a malfunction in the at least one sensor than in a case of no malfunction in the at least one sensor.

10. The brake system according to claim 1, wherein the second pressure-increase controller is configured to control the one pump motor to keep a rotation speed of each of the pumps constant.

11. The brake system according to claim 1,
wherein each of the electromagnetic valve devices comprises at least one electromagnetic valve each provided between a reservoir and a corresponding one of the brake cylinders, and
wherein the second pressure-increase controller comprises an electromagnetic-valve controller configured to bring the hydraulic pressures in the respective brake cylinders closer to the respective target hydraulic pressures by controlling a current to be supplied to at least one solenoid of the at least one electromagnetic valve of each of the electromagnetic valve devices.

12. The brake system according to claim 1,
wherein each of the electromagnetic valve devices comprises at least one electromagnetic valve each provided between a reservoir and a corresponding one of the brake cylinders, and
wherein the first pressure-increase controller is configured to control the one pump motor in a state in which at least one of the at least one electromagnetic valve is closed in each of the electromagnetic valve devices.

* * * * *